(12) United States Patent
Anderson

(10) Patent No.: US 11,325,621 B2
(45) Date of Patent: May 10, 2022

(54) APPARATUS AND METHOD FOR DISPENSING A LUBRICANT TO THE RAIL AND DETERMINING THE AMOUNT OF LUBRICANT DISPENSED AND REMAINING

(71) Applicant: Whitmore Manufacturing, LLC, Rockwall, TX (US)

(72) Inventor: Steve D. Anderson, Rockwall, TX (US)

(73) Assignee: Whitmore Manufacturing, LLC, Rockwall, TX (US)

( * ) Notice: Subject to any disclaimer, the term of this patent is extended or adjusted under 35 U.S.C. 154(b) by 343 days.

(21) Appl. No.: 16/612,506

(22) PCT Filed: May 14, 2018

(86) PCT No.: PCT/US2018/032499
§ 371 (c)(1),
(2) Date: Nov. 11, 2019

(87) PCT Pub. No.: WO2019/221691
PCT Pub. Date: Nov. 21, 2019

(65) Prior Publication Data
US 2021/0171071 A1 Jun. 10, 2021

(51) Int. Cl.
*B61K 3/00* (2006.01)
*F16N 7/38* (2006.01)

(52) U.S. Cl.
CPC ................. *B61K 3/00* (2013.01); *F16N 7/38* (2013.01); *F16N 2230/02* (2013.01); *F16N 2270/20* (2013.01)

(58) Field of Classification Search
CPC .................................... B61K 3/00; F16N 7/38
(Continued)

(56) References Cited

U.S. PATENT DOCUMENTS 2,238,732 A 4/1941 Huber
3,034,543 A * 5/1962 Du Bois .................. B60P 3/24
141/21

(Continued)

FOREIGN PATENT DOCUMENTS

GB 2405910 A 3/2005

*Primary Examiner* — Michael R Mansen
*Assistant Examiner* — Mark K Buse
(74) *Attorney, Agent, or Firm* — Marc L. Delflache; Jones Delflache LLP

(57) ABSTRACT

An improved method and apparatus for determining the amount of lubricant dispensed to a rail, adjusting the amount of available lubricant for dispensing based on the amount of lubricant remaining, and advising the operator of same. The apparatus includes a reservoir of lubricant suspended from a load beam having load cells communicating with a microprocessor and a controller to determine the amount of lubricant remaining within the reservoir on a real-time basis as lubricant is dispersed. The method includes the determination of the amount of lubricant remaining and, following dispensing additional lubricant, re-determining the amount of lubricant remaining. In this manner, an operator may prepare a schedule for replenishment of the reservoirs of various lubricating stations based on feedback of the remaining amount of lubricant remaining. Thus, an operator may predict track downtime for refilling of a plurality of lubricating stations and schedule such to minimized track downtime.

26 Claims, 8 Drawing Sheets

(58) Field of Classification Search
USPC .......................................................... 184/3.1
See application file for complete search history.

(56) References Cited

U.S. PATENT DOCUMENTS

| | | | |
|---|---|---|---|
| 4,214,647 A | 7/1980 | Lutts | |
| 4,334,596 A | 6/1982 | Lounsberry, Jr. | |
| 4,856,617 A | 8/1989 | Lounsberry, III | |
| 5,876,501 A * | 3/1999 | Doan | B05C 13/02 |
| | | | 118/679 |
| 6,464,039 B1 * | 10/2002 | Urmson | B61K 3/00 |
| | | | 184/3.1 |
| 6,591,943 B1 * | 7/2003 | Lindner | F16N 7/38 |
| | | | 184/15.3 |
| 9,475,528 B2 * | 10/2016 | Picard | B60P 1/60 |
| 2002/0056592 A1 * | 5/2002 | Arens | B61K 3/00 |
| | | | 184/3.1 |
| 2004/0011593 A1 * | 1/2004 | Appleby | B61K 3/00 |
| | | | 184/3.1 |
| 2004/0031647 A1 * | 2/2004 | Leslie | B61K 3/00 |
| | | | 184/3.1 |
| 2006/0163004 A1 * | 7/2006 | Kumar | B61K 3/00 |
| | | | 184/3.1 |
| 2008/0083584 A1 * | 4/2008 | Urmson | B61K 3/00 |
| | | | 184/3.1 |
| 2009/0000870 A1 * | 1/2009 | Holland | B61K 3/00 |
| | | | 184/3.1 |
| 2009/0050409 A1 * | 2/2009 | Wakamatsu | B61K 3/00 |
| | | | 184/3.1 |
| 2010/0224449 A1 * | 9/2010 | Singleton | B61K 3/00 |
| | | | 184/3.1 |
| 2013/0233649 A1 * | 9/2013 | Appleby | B61K 9/08 |
| | | | 184/3.1 |

\* cited by examiner

| LUBRICANT WEIGHT | PUMP 162 OUTPUT |
|---|---|
| 500Lbs | 6 oz PER EVERY 6 RAIL WHEELS |
| 400Lbs | 6 oz PER EVERY 6 RAIL WHEELS |
| 300Lbs | 4 oz PER EVERY 6 RAIL WHEELS |
| 250Lbs | 3 oz PER EVERY 6 RAIL WHEELS |
| 200Lbs | 2 oz PER EVERY 6 RAIL WHEELS |
| 150Lbs | 2 oz PER EVERY 8 RAIL WHEELS |
| 100Lbs | 1.5 oz PER EVERY 8 RAIL WHEELS |
| 75Lbs | 1 oz PER EVERY 12 RAIL WHEELS |
| 50Lbs | 0.5 oz PER EVERY 20 RAIL WHEELS |
| 0Lbs | PUMP SHUTS OFF |

FIG. 9

SCHEDULE REPORT AS OF 06-01-2018 BY PRIORITY

| PRIORITY | REGION | TRACK LOCATION | AMOUNT OF LUBRICANT REMAINING (OUNCES) | ESTIMATED EXHAUSTION DATE OF LUBRICANT |
|---|---|---|---|---|
| A | 1 | 1-102 | 30 | 06-05-18 |
| A | 3 | 3-302 | 29 | 06-06-18 |
| A | 3 | 3-305 | 26 | 06-07-18 |
| A | 2 | 2-209 | 35 | 06-07-18 |
| B | 1 | 1-109 | 51 | 06-12-18 |
| B | 1 | 1-110 | 56 | 06-11-18 |
| B | 3 | 3-302 | 67 | 06-15-18 |
| B | 3 | 3-307 | 71 | 06-16-18 |
| B | 2 | 2-210 | 55 | 06-17-18 |
| C | 1 | 1-101 | 91 | 06-29-18 |
| C | 1 | 1-111 | 89 | 06-28-18 |
| C | 1 | 1-112 | 95 | 06-28-18 |
| C | 3 | 3-311 | 94 | 06-26-18 |
| C | 3 | 3-301 | 95 | 06-27-18 |
| C | 2 | 2-202 | 99 | 06-28-18 |

APPARATUS AND METHOD FOR DISPENSING A LUBRICANT TO THE RAIL AND DETERMINING THE AMOUNT OF LUBRICANT DISPENSED AND REMAINING

FIELD OF THE DISCLOSURE

This invention relates to a method and apparatus for applying lubricant to the rail of a railroad track. More particularly, this invention relates to a method and apparatus for determining the amount of lubricant dispensed to the rail, adjusting the amount of available lubricant for dispensing based on the amount of lubricant remaining, and advising the operator of same.

BACKGROUND OF THE INVENTION

The placement of lubricant on the rail and the flanged wheel of a rolling stock is important, for example, to prolong the life of the rail and the flanged wheel, reduce rail noise, and ensure adequate acceleration and braking as the need arises. Apparatus and systems exist for the dispensing of lubricant onto the rail and the flanged wheels of a rolling stock. Such apparatus and systems, typically located on the ground proximate to the track upon which the stock run, have been in use for many years and are exemplified, for example, by U.S. Pat. No. 2,238,732 to Huber; U.S. Pat. No. 4,214,647 to Lutts; U.S. Pat. No. 4,334,596 to Lounsberry; U.S. Pat. No. 4,856,617 Lounsberry, and GB 2 405 910A of Ian Sim, the disclosures of which patents and GB application are hereby incorporated herein by reference and made a part of this application.

However, such apparatus and systems cannot determine the amount of lubricant that has been dispensed and how much remains in the reservoir for subsequent use. This is important because the rail operator needs to know when the reservoir within each dispensing station should be refilled.

Therefore, the need exists for an accurate and reliable method and apparatus that measures the amount of lubricant being dispensed and is capable of adjusting the amount of lubricant being dispensed and advising the operator of the amount of lubricant remaining in the reservoir of each such lubricating station.

Preferably, such a method and apparatus includes the ability to reduce the amount of lubricant being dispensed until the apparatus may be serviced and refilled, and even more preferably communicate to an operator the status of a plurality of such apparatus and systems being maintained and operated by the operator in order that a schedule may be established to replenish the reservoirs of such plurality of apparatus and systems with minimal interference in scheduled train times and improving the efficiency of rail traffic.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

BRIEF SUMMARY OF THE INVENTION

In order to determining the amount of lubricant being dispensed and adjust the amount of subsequent lubricant to be dispensed based on availability, the present invention comprises a housing, a reservoir for storing the lubricant, at least one member for supporting the reservoir within the housing, at least one sensor proximate the support member for generating a first signal, and a microprocessor for receiving the first signal to determine the amount of lubricant remaining therein.

In another embodiment, the present invention may also comprise a pump for advancing the lubricant from the reservoir and a controller in communication with the microprocessor to activate the pump.

In a further embodiment, the invention may include a rail sensor adjacent the rail for sensing the passage of a rail wheel and sending a signal to the controller to activate the pump to dispense lubricant. In this manner, when a rail wheel passes the rail sensor it sends a signal to the controller which then activates the pump to dispense the lubricant. After the lubricant has been dispensed, the microprocessor determines the amount of lubricant remaining based on the signal generated by the sensor proximate the load support member. The microprocessor advises the controller of same and the controller then adjusts the amount of lubricant to be subsequently dispensed by subsequent activation of the pump to minimize use of the lubricant until it can be refilled but also ensuring enough lubricant is being dispensed to perform its intended purpose. In this manner, the amount of lubricant is preserved until it may be refilled by the operator.

In yet a further embodiment, the invention may include a remote monitoring processor which receives data from the microprocessor and the controller and transmits the data by cellular or satellite to a website for collection and visualization by the operator. In this manner, the operator may collect information from a variety of different lubricating stations and prepare a schedule to visit a plurality of lubricating stations and refill their reservoirs, thereby minimizing downtime of the tracks and improving the efficiency of rail traffic.

The present invention is also a method for determining the amount of lubricant remaining in the reservoir of one or more rail lubricating stations comprising the step of generating a signal from the first sensor which is indicative of the weight of the reservoir and lubricant located therein within a lubricating station. A determination is then made of the weight of the reservoir and the lubricant located therein using a microprocessor. A signal is generated from a second sensor proximate at least one of the rails indicating the passing of a railroad wheel. Lubricant is then pumped from the reservoir onto the rail. A second signal is then generated from the first sensor indicative of the weight of the reservoir and the remaining lubricant located within that reservoir once the pumping has been completed. The weight of the reservoir and the remaining lubricant located within the reservoir is then re-determined using the microprocessor and an adjustment is then made as to the amount of lubricant to be dispersed onto the rail based on the remaining amount of lubricant located within the reservoir.

In another embodiment, the present invention further comprises the step of transmitting data generated by the microprocessor based on the signals from the first sensor by cellular or satellite to a website for collection and visualization.

In a further embodiment, the signal generated from the first sensor is continuous and is monitored in real-time on a continuous basis.

In yet a further embodiment, the present invention further comprises the preparation of a schedule for the replenishment of lubricants of a plurality of lubricating stations based on data reflecting the amount of lubricant remaining within the reservoir of each lubricating station.

Accordingly, the present disclosure includes features and advantages which are believed to enable it to adjust the amount of available lubricant to be dispensed and to advise the operator of remaining amounts of lubricant at various lubricating stations so that replenishment of each one's reservoir may be scheduled and refilled in an efficient manner to minimize track downtime.

BRIEF DESCRIPTION OF THE DRAWINGS

FIG. 9 is a report based on amount of lubricant remaining by lubricating station according to the present invention.

DETAILED DESCRIPTION OF THE INVENTION

Figure 1:
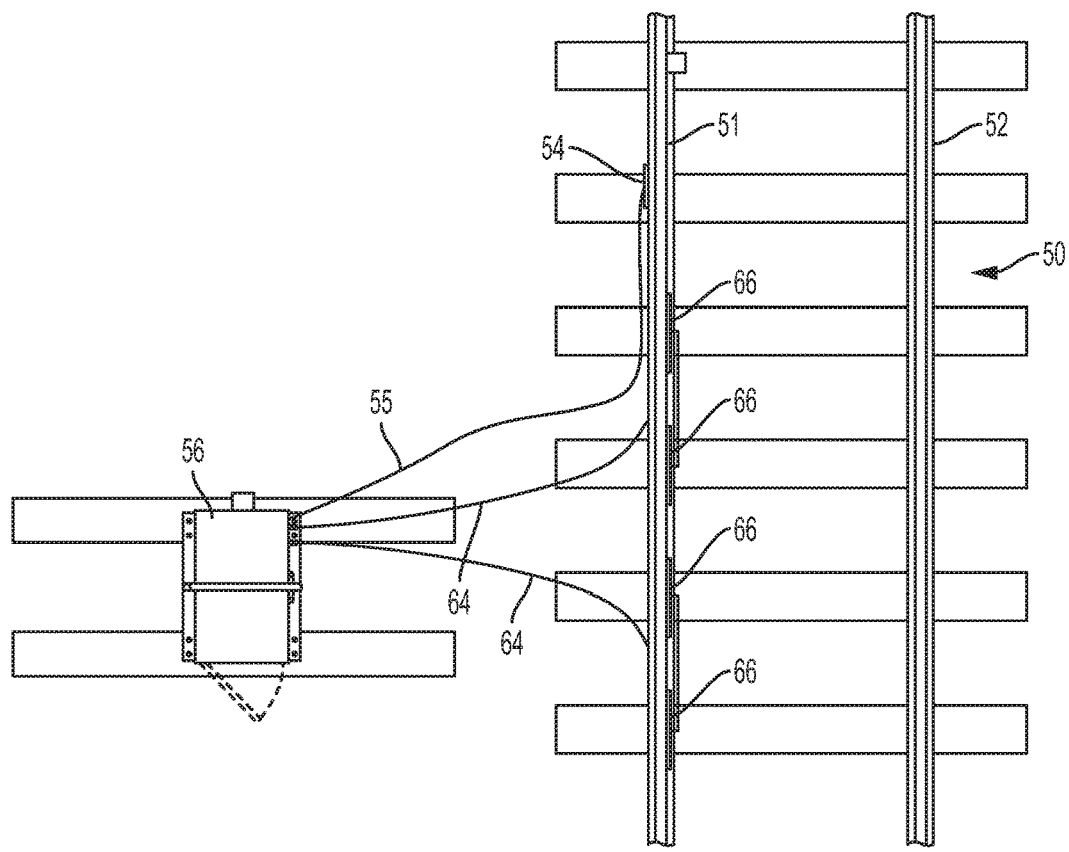
FIGS. 1 and 2 are schematic views of a prior art system.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

The term "coupled" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function.

Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Preferred embodiments of the present disclosure thus offer advantages over the prior art and are well adapted to carry out one or more of the objects of this disclosure. However, the present disclosure does not require each of the components and acts described above and are in no way limited to the above-described embodiments or methods of operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

The present invention now will be described more fully hereinafter with reference to the accompanying drawings, in which some preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
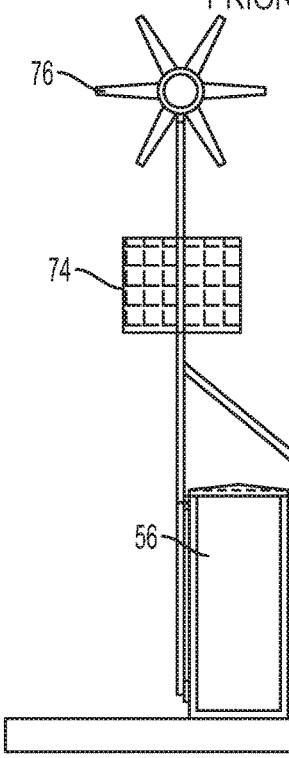
Figure 3:
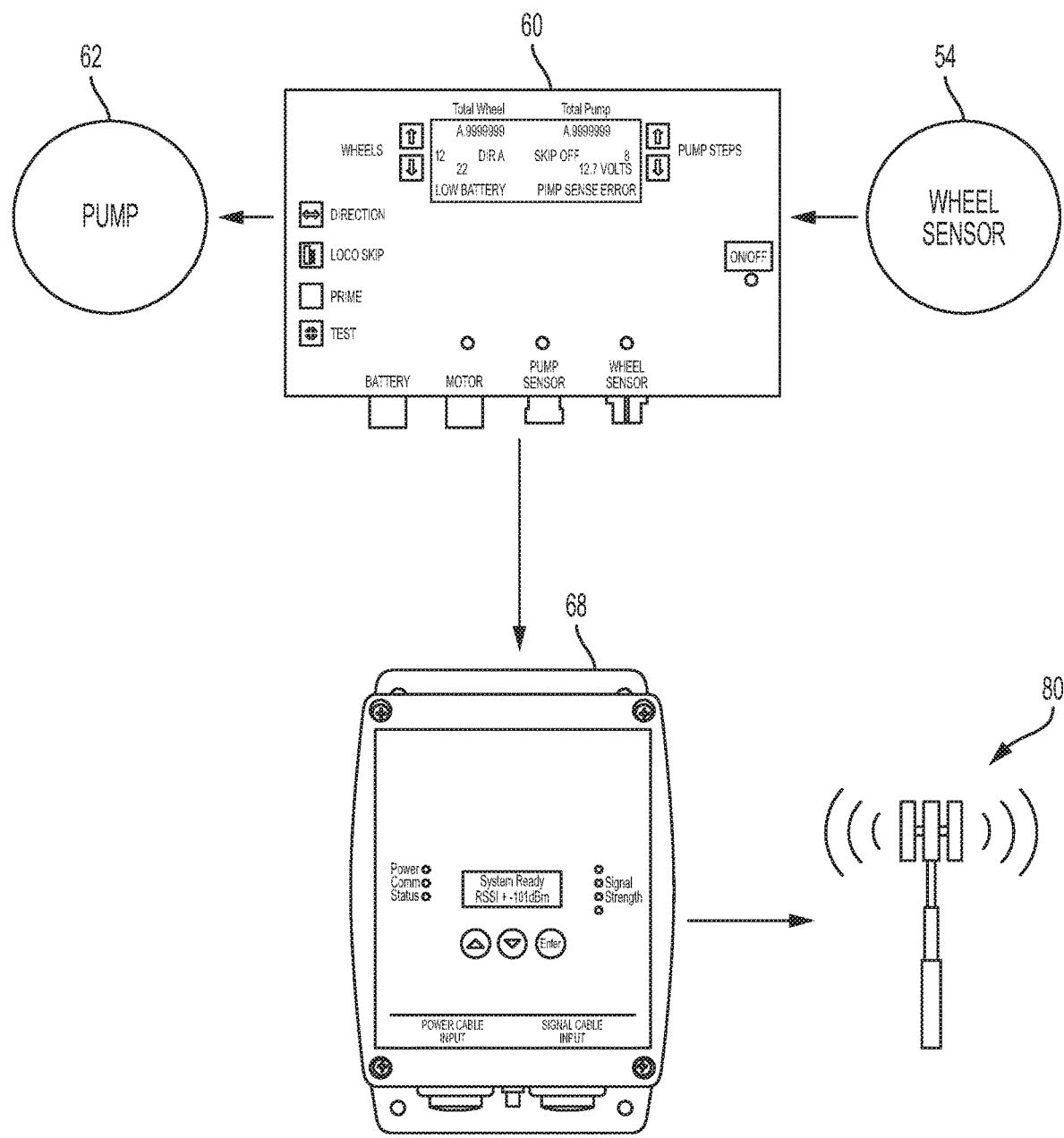
FIG. 3 is a flowchart of the prior art system.
Figure 4:
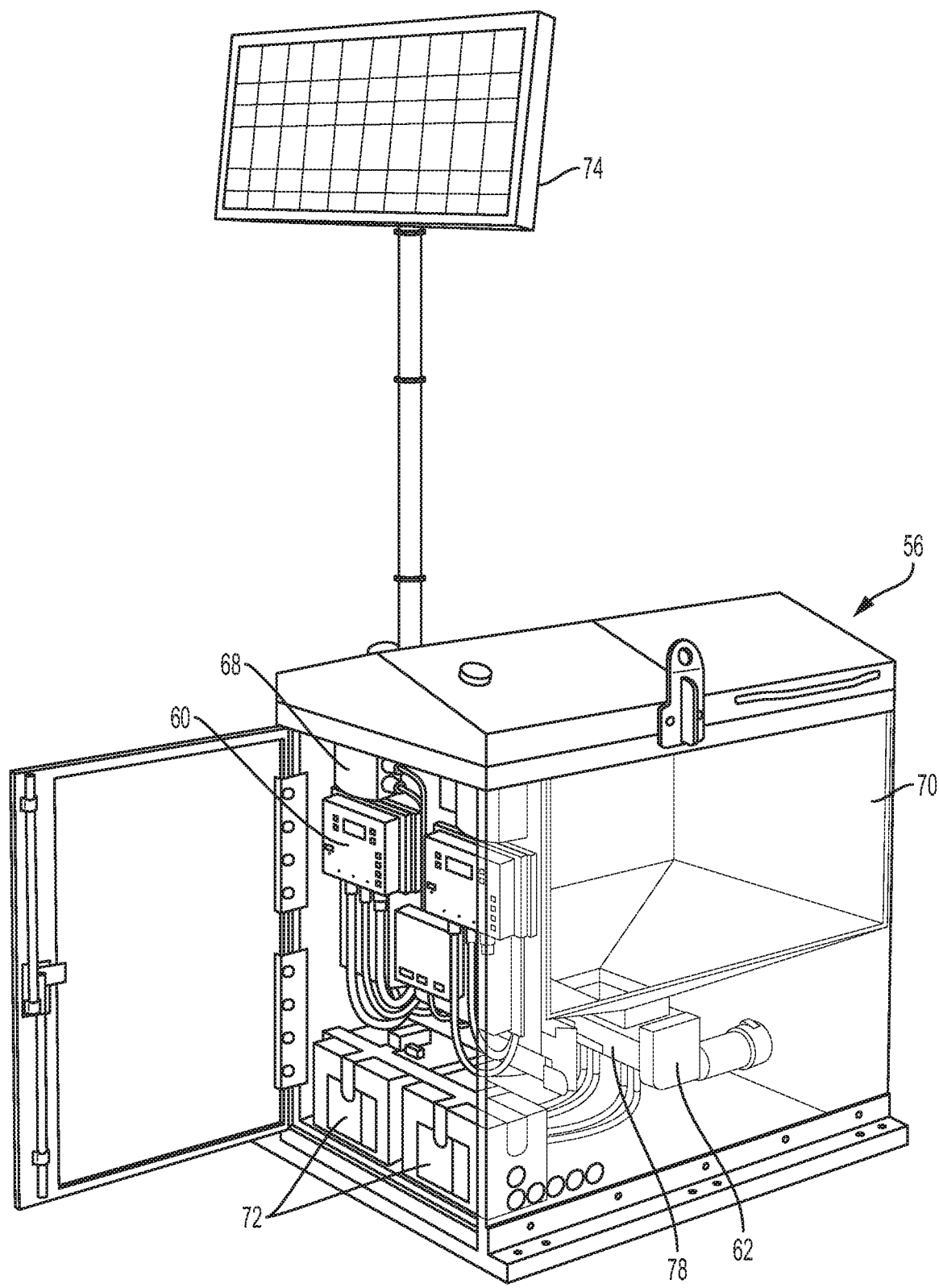
FIG. 4 is a perspective view of the prior art system.
Figure 5:
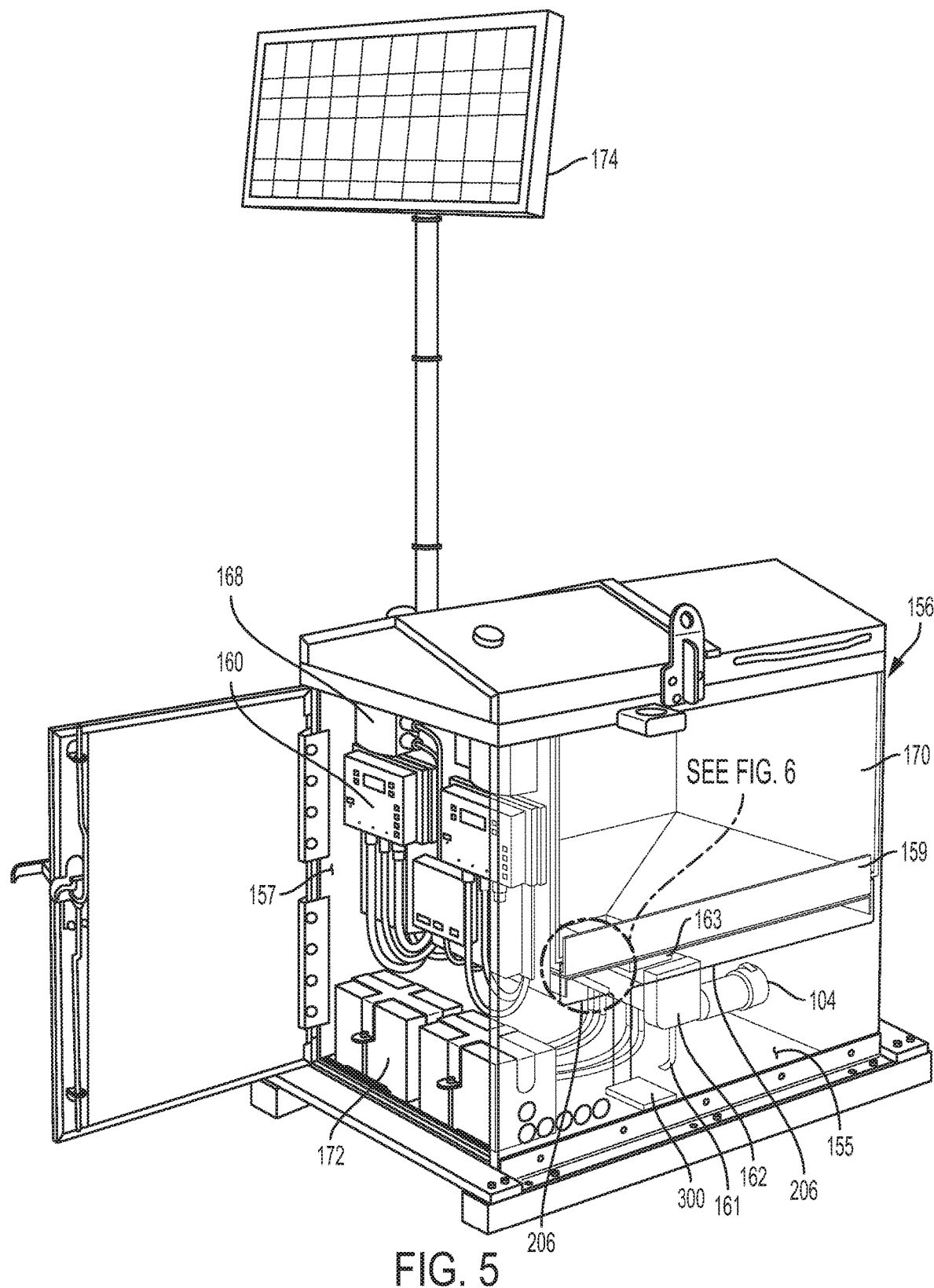
FIG. 5 is a perspective view of a portion of the present invention.
Figure 6:
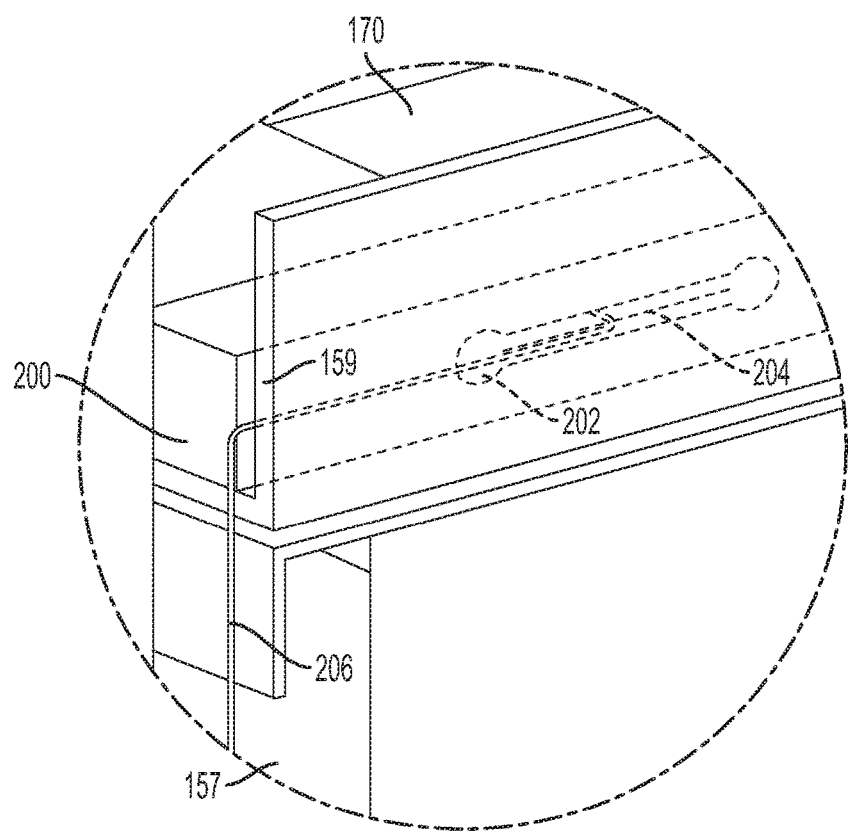
FIG. 6 is a detail view taken from FIG. 5.
Figure 7:
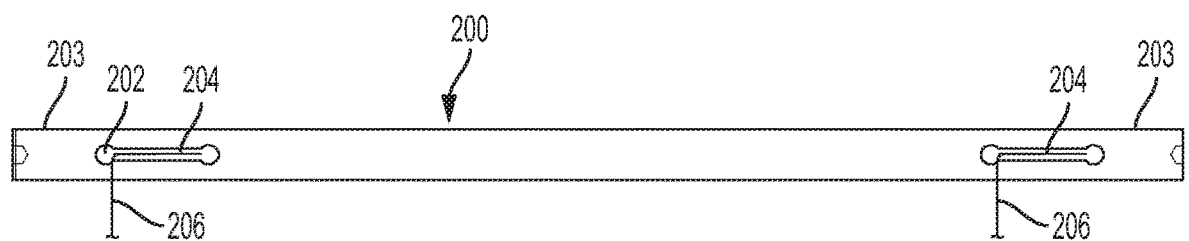
FIG. 7 is a detailed view of a portion of the present invention.

Referring now to FIGS. 1-4, the prior art is shown which illustrates schematically a railway track 50 having rails 51, 52 and a trackside enclosure 56. A wheel sensor 54 associated with one of the tracks creates a signal every time a wheel passes over that piece of track. The signal is sent to a controller 60 within enclosure 56 by way of a wheel sensor cable 55. The enclosure 56 is of a robust, waterproof construction, and manufactured, for example, of galvanized and powered coated metal, as shown in FIG. 4. Controller 60 would then activate pump 62 within enclosure 56 that would then distribute lubricant through hoses 64 to lubricant distributor blades 66 located on the side of track 51 to be lubricated.

As shown in FIG. 2, wind or solar power may be provided through solar panels 74 or wind turbines 76 located proximate housing 56. Alternatively, batteries 72 (see FIG. 4) other fuel cells may be used or other another power source as appropriate.

This prior art system is further shown schematically in FIG. 3 and in a perspective view in FIG. 4. This system as shown in FIGS. 1-4 is commercially available from Whitmore Rail, located in Rockwall, Tex., www.whitmores.com as the Whitmore® AccuTrack® 2.0 system Referring now to FIGS. 3-4, once a train wheel passes sensor 54 (such as model WRL212-12, part no. NJ50-FP-QA-P1, available from Whitmore Rail, www.whitmores.com) a signal is generated and sent to at least one controller 60 (such as model Whitmore® RGD Controller, part no. WRL205-10, available from Whitmore Rail, www.whitmores.com) supported within enclosure 56. Controller 60 is in electrical communication with pump 62, also supported within housing 56. Pump 62 is in fluid communication with the lubricant within reservoir 70. Preferably, controller 60 is also capable of monitoring single axle or twin axle movement in either direction. It includes variable settings for the number of train wheels, continuous wheel count, and total pumping steps that have been performed. Preferably controller 60 allows for various settings to control the performance and output of lubricant, these settings include recognition of train wheels passing over the wheel sensor, lubricant output volume and frequency from the output pump, clearing recorded values, powering controller on/off and it provides user interface with messages regarding any deviations from normal operation. Some of those messages are, for example, low battery, pump sensor errors, motor shut down, wheel sensor errors, and train in motion. Also, preferably controller 60 is a sealed assembly with all electrical connections having external ports. All such features are available from the model Whitmore® RGD Controller, noted above.

Referring now to FIG. 3, controller 60 communicates with remote monitoring device 68, such as model RFM-110, available from Whitmore Rail, www.whitmores.com. Device 68 is linked to an Elecsys Web application. Preferably, device 68 provides telemetry of data from controller 60. Device 68 can be a cellular, satellite, Ethernet, or Wi-Fi device that communicates measured and recorded parameters such as, for example, voltage, temperature, lubricator settings, battery charging power from solar panel, train wheel counts, train speed, train direction, door alarms, and displayed on a website hosted by Elecsys, that can be viewed via computer, tablet or smart phone. The data is compared to predetermined set points, to provide alarms and notifications if performance is outside set points of acceptable parameters. The Elecsys RFM is a device that provides data concerning the performance of the lubricating station remotely via website, tablet or smart phone. The Elecsys RFM and remote access to each lubricator allows for better monitoring of lubricator performance, indications of alerts or alarms if a lubricator is operating outside the normal parameters and allows monitoring, as well as historical trending of the accumulated performance data. All such functions are available from model RFM-110, available from Whitmore® Rail as noted above.

Referring now to FIG. 4, the placement of the various components within the prior art Whitmore® AccuTrack® 2.0 system are shown. Specifically, reservoir 70 is supported in a fixed manner to the housing or enclosure 56. Pump 62 is attached at the bottom of reservoir 70 and in fluid communication with lubricant (not shown) stored within reservoir 70. Motor 78 is mounted adjacent pump 62 to operate pump 62 upon command by controller 60. Preferably, pump 62 is a positive displacement pump. Controller 60 and remote monitoring device 68 are also supported within housing 56. Batteries 72 or other fuel cells are mounted within housing 56 and in electrical communication with controller 60, device 68, and motor 78. Wind or solar power may be provided through solar panels 74 or wind turbines 76 (see FIG. 2) located proximate housing 56. Alternatively other fuel cells may be used or other power source as appropriate.

Referring still to FIGS. 1-4, during operation, as a first wheel passes sensor 54, a signal is generated and sent to controller 60 which thereby begins recording specified data as preset within controller 60 as described above. Based on the passing of a wheel, the controller activates pump 62 which then pumps lubricant from reservoir 70 within the enclosure 56 through the distribution lines 64 to distribution blades 66 and onto track 51. Concurrently, information or data are sent from controller 60 to remote monitoring device 68. Device 68 then conveys this information or data as collected by controller 60 or by the device 68 itself via cellular 80 or satellite to a website for collection and visualization.

Reservoir 70 has included lubrication monitoring previously using sonic sensors, lasers and pressure transducers to measure percentage full of reservoir 70. The sonic sensor sent an electronic signal from above reservoir 70 and tried to interpret the amount of time required for the electronic signal to return to the device. It then estimated the reservoir level in percentage full of lubricant. This turned out to be unreliable. Lasers were mounted above the reservoir to emit an electronic signal down into the reservoir. It tried to measure reservoir level based on line of sight and distance of the lubricant inside the reservoir from the laser. This technique turned out to be unreliable as well. Pressure Transducers were also mounted to the lower outlet of the reservoir to measure the head pressure of the lubricant in the reservoir. This pressure reading was used to try to estimate the reservoir level based on the pressure exerted on the pressure transducer. As before this technique also tuned out to be unreliable.

All of those previous attempts to monitor lubricant level have failed due to the tendency of the lubricant to conglomeration and clump to one side or another of the reservoir. This is important as lubricant may be sold by the pound. Thus, knowing the actual amount of lubricant remaining by pound or weight provides a superior basis.

Referring now to FIGS. 5-8, the present invention compared to the prior art system shown in FIGS. 1-4 will be discussed. As used herein, the term lubricating station refers to system such as that shown in FIGS. 4 and 5 that dispenses lubricant as described herein. As noted above, the need exists for a system and apparatus that measures the amount of lubricant being dispensed, is capable of adjusting the amount of lubricant being dispensed, and advising the operator of the amount of lubricant remaining in the reservoir of each such lubricating station. In order to accomplish such, real-time accurate measurements must be made of the amount of lubricant remaining in the reservoir storing the lubricant, preferably on a continuous basis.

Referring still to FIGS. 5-8, reservoir 170 is supported within housing 156 along the interior side surfaces 157 of housing 156. Brackets or shelfs 159 are attached to opposite sides 157. A load beam 200 is securely supported on each shelf 159. Each load beam 200 includes an elongated slot 202 proximate either end 203 of load beam 200. A strain gauge load cell 204 is secured within each elongated slot 202 to measure deflection of load beam 200 based on the combined weight of reservoir 170 and lubricant stored therein. In this manner, load cells 204 measure the real-time weight of the combined reservoir 170 and remaining lubricant at any time. Preferably, reservoir 170 does not touch any other portion of housing 156 so as not to interfere with the readings generated by load cells 204. In this manner, load beam 200 having cells 204 serves to provide for a "free-floating" reservoir. As used herein, the term "free-floating" means the weight of reservoir 170 is substantially fully supported by load beams 200. In this manner, load beams 200 accurately measure the actual weight of the lubricant with very little mechanical interference or mathematical compensations/estimations as the prior art technologies mentioned above require.

The fabrication of load beams 200 having load cells 204 will be apparent to those skilled in the art based on this disclosure. Load beams 200 having load cells 204 are available commercially as model RINLDBB-B01-500 through the 3S Engineering Company in Sri Lanka.

Figure 8:
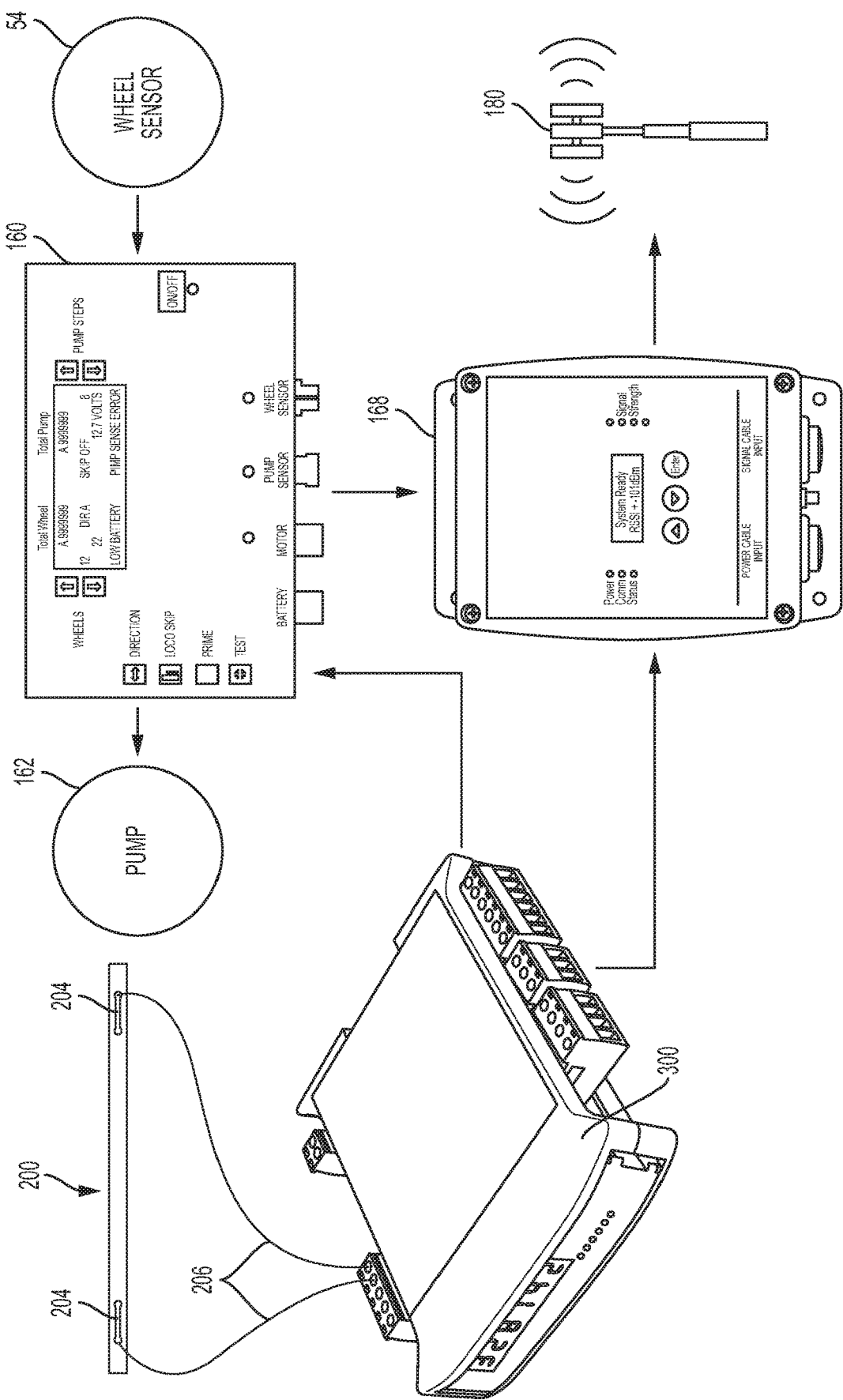
FIG. 8 is a flowchart of the present invention.

Referring still to FIGS. 5-8 and in particular FIG. 8, the signals being generated by each load cell 204 are sent via wires 206 to microprocessor weight system 300 which combines all the signals and determines active real-time weight of the combined load cell 204 readings. Microprocessor weight system 300 permits the tare weight of reservoir 170 to be zeroed out so that the signal and display from the microprocessor weight system 300 to controller 160 and device 168 reflects only the weight of the lubricant remaining in reservoir 170. Such microprocessor weight systems are commercially available as, for example, the Dini Argeo® Weighing Systems Model DGT1S from Dini Argeo s.r.l. of Modena, Italy, www.diniargeo.com or the Rice Lake Weighing System Model SCT-1100 from the Rice Lake Company of Rice Lake, Wis. 54868, www.ricelake.com As noted, the output from microprocessor weight system 300 is then sent to controller 160 and remote control device 168 for processing consistent with the discussion provided above. Controller 160 may be the same commercially available controller as mentioned for the prior art Whitmore® AccuTrack® 2.0—that is Whitmore® RGD Controller, part no. WRL205-10. Remote monitoring device 168 may also be the commercially available device as mentioned above for the prior art Whitmore® AccuTrack® 2—that is, Whitmore® model RFM-110. Both controller 160 and device 168 operate in the same manner as discussed above except that they are now receiving continuous signal from microprocessor weigh system 300 and, therefore, constantly process a re-determined remaining weight of the lubricant in reservoir 170 as pump 162 disperses lubricant, therefore lowering the combined weight of the remaining lubricant and reservoir 170.

Pump 162 is located proximate floor 155 of enclosure 156 and supported by brace 161. Pump 162 is also proximate the bottom opening 163 of reservoir to receive lubricant when activated to pump. Pump 162 is preferably a positive displacement pump suitable for movement of the lubricant from within reservoir 170 out through outlet 104 into hoses 64 and toward distribution blades 66 adjacent rail 51. Motor 178 drives pump 162 upon activation by controller 160. Batteries 172, or other power sources such as solar panel 174, or other suitable power sources may be used to provide the power needed to operate the system and its components as described herein.

As pump 162 disperses lubricant from reservoir 170, load cells 204 continuously measure a real-time change in the weight of reservoir 170 and remaining lubricant within reservoir 170. This continuous measurement from load cells 204 are sent to microprocessor 300 which continuously recalculates the weight of reservoir 170 and the lubricant remaining within the reservoir 170. Such continuous signal is then sent to controller 160 and device 168 for processing as described herein.

Controller 160 may be set to correlate the weight of a particular lubricant and the reservoir to yield a signal or message that reservoir 170 is full or partial full of the lubricant, such as ¾ full, ½ full, or ¼ full, or that there are X ounces remaining in the reservoir as discussed further below. Controller 160 may be preset to reduce the amount of lubricant being dispersed as the amount of lubricant decreases, thereby prolonging the time before a trip is required by the operator to replenish reservoir 170. For example, when controller 160 determines based on the signals from microprocessor 300 that reservoir 170 is only half full it may reduce the amount of lubricant dispersed the next time sensor 54 advises controller 160 of a preset number of wheels or axles that have passed from for example, four ounces of lubricant to two ounces of lubricant, thereby prolonging the time before reservoir 170 is empty. It will be obvious to one skilled in the art that controller 160 may be preset to accommodate a variety of factors, such as the number of wheels or axles, amount of dispersant. These settings, once again, may be preset in controller 160 Whitmore® RGD Controller, part no. WRL205-10.

Figures 10, 11:
FIG. 10 is a dialog screen selecting parameters for the generation of a schedule according to the present invention.
FIG. 11 is a schedule created according to the present invention.

Referring now to FIGS. 9-11, the manipulation of the data will be described further. FIG. 9 is a table which is illustrative of a reduction in the amount of lubricant dispensed as the amount of lubricant in reservoir 170 decreases. Such is preset in controller 160 and is merely illustrative. When the operator wishes to create a maintenance schedule to refill the various lubricating stations in order to minimize track downtime and improve efficiency, the operator would select the parameters for the generation of the scheduling report from a pulldown dialog screen as shown in FIG. 10. For example, the screen may include such parameters as priority, region, track location, amount of lubricant remaining, and date order for service. Obviously, such parameters are merely illustrative and any number of additional parameters may be included based on the preset factors selected in controller 160. The submit button in FIG. 10 is then pushed and a schedule is generated as shown in FIG. 11.

Referring now to FIG. 11, a schedule may be generated based on any order. As shown in FIG. 11, the order is selected based on the priority "A", or "B", or "C", for example. The parameters for these priorities would be preset and may be redefined as needed. Also, the schedule may be reorganized based on data in any column, as is common knowledge to one of ordinary skill in the art Since the operator receives data from controller 160 and device 168 via satellite or cellular 180 on a continuous basis, the data included in the scheduling report is real-time. In this manner, the operator may schedule crews to service more urgent lubricating stations that are running low on lubricant. Since the present invention provides for the gradual reduction in the amount of lubricant being dispensed as it decreases in available lubricant as shown in FIG. 9, the maintenance schedule may be extended which further improves efficiencies and results in further minimization of track downtime.

This invention has been described with reference to the preferred embodiments. Obvious modifications and alterations will occur to others upon reading and understanding the preceding detailed description. It is intended that the invention be construed as including all such modifications and alterations.

What I claim is:

1. An apparatus for dispensing lubricant along a rail comprising:
   a housing;
   a reservoir for storing the lubricant;
   a system for sensing the weight of the lubricant within said reservoir comprising: (a) means for supporting said reservoir within said housing wherein said reservoir is substantially fully supported by said supporting means in a free-floating manner adapted to transfer substantially only gravity loads, and (b) at least two sensors proximate said support means for generating a first signal indicative of the weight of said reservoir and the lubricant within said reservoir; and
a microprocessor for receiving said first signal to determine a weight of said reservoir and lubricant stored therein.

2. The apparatus according to claim 1 wherein said supporting means comprises two elongated members each elongated support member having at least one slot proximate either end of each the support member.

3. The apparatus according to claim 1, further comprising:
a pump for advancing the lubricant from said reservoir; and
a controller in communication with said microprocessor to activate said pump.

4. The apparatus according to claim 3, further comprising:
a sensor adjacent the rail for sensing the passage of a rail wheel and sending a signal to said controller to activate said pump to dispense lubricant,
wherein said microprocessor subsequently determines the weight of the lubricant remaining within the reservoir following said dispensing of lubricant to determine the amount of lubricant remaining in said reservoir.

5. The apparatus according to claim 4, further comprising a remote monitoring processor to receive data from said microprocessor and said controller and transmits the data by cellular or satellite to a website for collection and visualization.

6. An apparatus for dispensing lubricant along a rail comprising:
a housing;
a reservoir for storing the lubricant and supported within said housing;
a system for sensing the weight of the lubricant within said reservoir comprising: (a) two members for supporting said reservoir within said housing in a free-floating manner adapted to transfer substantially only gravity loads, and (b) at least two sensors for generating a first signal indicative of the weight of said reservoir and the lubricant within said reservoir;
a microprocessor for receiving said signal to determine the weight of said reservoir and lubricant stored therein;
a pump for advancing the lubricant from said reservoir to the rail; and
a controller in communication with said microprocessor to activate said pump on demand.

7. The apparatus according to claim 6, further comprising:
a sensor adjacent the rail for sensing the passage of a rail wheel and sending a signal to said controller to activate said pump to dispense lubricant,
wherein said microprocessor subsequently determines the weight of the lubricant remaining within the reservoir following said dispensing of lubricant to determine the amount of lubricant remaining in said reservoir.

8. The apparatus according to claim 7, further comprising a remote monitoring processor to receive data from said microprocessor and said controller and transmits the data by cellular or satellite to a website for collection and visualization.

9. The apparatus according to claim 6, further comprising a power source for the operation of said microprocessor, pump, or controller.

10. The apparatus according to claim 9, wherein said power source comprises a battery.

11. The apparatus according to claim 9, wherein said power source comprises a solar panel.

12. The apparatus according to claim 9, wherein said power source comprises a wind turbine.

13. An apparatus for dispensing lubricant along a rail comprising:
a housing;
a reservoir for storing the lubricant and supported within said housing;
a system for sensing the weight of the lubricant within said reservoir comprising: (a) means for supporting said reservoir within said housing wherein said reservoir is substantially fully supported by said supporting means in a free-floating manner adapted to transfer substantially only gravity loads, and (b) at least two sensors proximate said support means for generating a first signal indicative of the weight of said reservoir and the lubricant within said reservoir;
a microprocessor for receiving said first signal to determine a weight of said reservoir and lubricant stored therein;
a pump for advancing the lubricant from said reservoir to the rail;
a controller in communication with said microprocessor to activate said pump on demand;
a sensor adjacent the rail for sensing the passage of a rail wheel and sending a signal to said controller to activate said pump to dispense lubricant; and
a remote monitoring processor to receive data from said microprocessor and said controller and transmits the data by cellular or satellite to a website for collection and visualization.

14. The apparatus according to claim 13, further comprising a power source for the operation of at least said microprocessor, pump, and controller.

15. The apparatus according to claim 14, wherein said power source comprises a battery.

16. The apparatus according to claim 15, wherein said power source comprises a wind turbine.

17. The apparatus according to claim 14, wherein said power source comprises a solar panel.

18. A method for determining the amount of lubricant remaining in the reservoir of one or more rail lubricating stations proximate railroad rails having rail wheels passing thereon, comprising the steps of:
generating a signal from a first sensor indicative of the weight of the reservoir and the lubricant located therein within the lubricating station;
determining the weight of the reservoir and lubricant located therein using a microprocessor;
generating a signal from a second sensor proximate at least one rail indicative of the passing of a wheel;
pumping lubricant from the reservoir onto the rail;
generating a subsequent signal from the first sensor indicative of the weight of the reservoir and the remaining lubricant located therein;
re-determining the weight of the reservoir and the remaining lubricant located therein using the microprocessor; and
adjusting the amount of lubricant to be dispersed onto the rail based on the remaining amount of lubricant located within the reservoir.

19. The method according to claim 18, further comprising the step of transmitting all data received generated by the microprocessor resulting from the first sensor via cellular or satellite to a website for collection and visualization.

20. The method according to claim 19, further comprising the preparation of a schedule for the replenishment of lubricants within the reservoir of each lubricating station based on the amount of lubricant remaining within the reservoir of each lubricating station.

21. The method according to claim 18, wherein said re-determination step occurs on a continuous basis.

22. A method for determining the amount of lubricant remaining in the reservoir of one or more rail lubricating stations proximate railroad rails having rail wheels passing thereon, comprising the steps of:
   generating a signal from a first sensor on a continuous basis indicative of the weight of the reservoir and the lubricant located therein within the lubricating station;
   determining the weight of the reservoir and lubricant located therein on a substantially continuous basis using a microprocessor;
   generating a signal from a second sensor proximate at least one rail indicative of the passing of a wheel;
   pumping lubricant from the reservoir onto the rail;
   generating a subsequent signal from the first sensor indicative of the weight of the reservoir and the remaining lubricant located within the reservoir;
   adjusting the amount of lubricant to be dispersed onto the rail based on the remaining amount of lubricant located within the reservoir; and
   transmitting all data received generated by the microprocessor resulting from the first sensor via cellular or satellite to a website for collection and visualization.

23. The method according to claim 22, further comprising the preparation of a schedule for the replenishment of lubricants within the reservoir of each lubricating station based on the amount of lubricant remaining within the reservoir of each lubricating station.

24. An apparatus for dispensing lubricant along a rail comprising:
   a housing;
   a reservoir for storing the lubricant;
   at least one member for supporting said reservoir within said housing wherein said reservoir is substantially fully supported by said at least one supporting member;
   at least one sensor proximate said support member for generating a first signal; and
   a microprocessor for receiving said first signal to determine a weight of said reservoir and lubricant stored therein,
   wherein said supporting member comprises an elongated member having at least one slot, said at least one sensor being affixed to said elongated member within said slot.

25. The apparatus according to claim 24 wherein said elongated member comprises a slot proximate either end of said member, one sensor being affixed within each slot of said elongated member.

26. An apparatus for dispensing lubricant along a rail comprising:
   a housing;
   a reservoir for storing the lubricant and supported within said housing;
   a system for sensing the weight of the lubricant within said reservoir comprising: (a) two members for supporting said reservoir within said housing in a free-floating manner, and
   (b) at least one sensor for generating a first signal indicative of the weight of said reservoir and the lubricant within said reservoir;
   a microprocessor for receiving said signal to determine the weight of said reservoir and lubricant stored therein;
   a pump for advancing the lubricant from said reservoir to the rail; and
   a controller in communication with said microprocessor to activate said pump on demand,
   wherein said supporting member comprises an elongated member having at least one slot, said at least one sensor being affixed to said elongated member within said slot.

* * * * *